May 8, 1962 W. J. SCHRENK 3,033,256
SCREEN CHANGER FOR EXTRUDERS
Filed Aug. 17, 1960

INVENTOR.
Walter J. Schrenk
BY Earl D. Ayers
AGENT

United States Patent Office 3,033,256
Patented May 8, 1962

3,033,256
SCREEN CHANGER FOR EXTRUDERS
Walter J. Schrenk, Bay City, Mich., assignor to The Dow Chemical Company, Midland, Mich., a corporation of Delaware
Filed Aug. 17, 1960, Ser. No. 50,173
4 Claims. (Cl. 146—174)

This invention relates to screen changer apparatus and particularly to screen changer apparatus which is adapted for use with extruders.

In the art of extruding plastic materials, especially those materials which are to be extruded to form thin plastic films, it is customary to place a screen between the output end of the extruder barrel and the die. The screens must be frequently changed in order to prevent excessive pressure drop across the screen as contaminants are caught thereon. In many extrusion and film making processes, it is highly desirable to be able to change screens without interrupting the flow of plastic with its consequent breaking or spoilage of the continuity of the extrude.

Accordingly, it is a principal object of this invention to provide an improved screen changing apparatus for use on extruders.

Another object of this invention is to provide an improved, simplified, positive acting screen changing apparatus.

Yet another object of this invention is to provide an improved screen changer apparatus which does not interrupt the flow through the extruder die as the screen is being changed.

In accordance with this invention, there is provided an adapter head having two flow channels extending therethrough. The adapter head is coupled between the extruder barrel and the die with both flow channels communicating with the barrel and die. A plug valve having two parallel but perpendicularly disposed flow bores disposed in alignment with the flow channels is disposed across the flow channels. Each flow bore contains a replacable screen. Means are provided for purging the air from each flow bore prior to the screen being placed "on stream" in the extruder.

The plug valve may be tapered longitudinally or may be cylindrical in form. Means are provided for removing the screen holding part of each flow bore.

The invention, as well as additional objects and advantages thereof, will best be understood when the following detailed description is read in connection with the accompanying drawings, in which.

Figure 1:
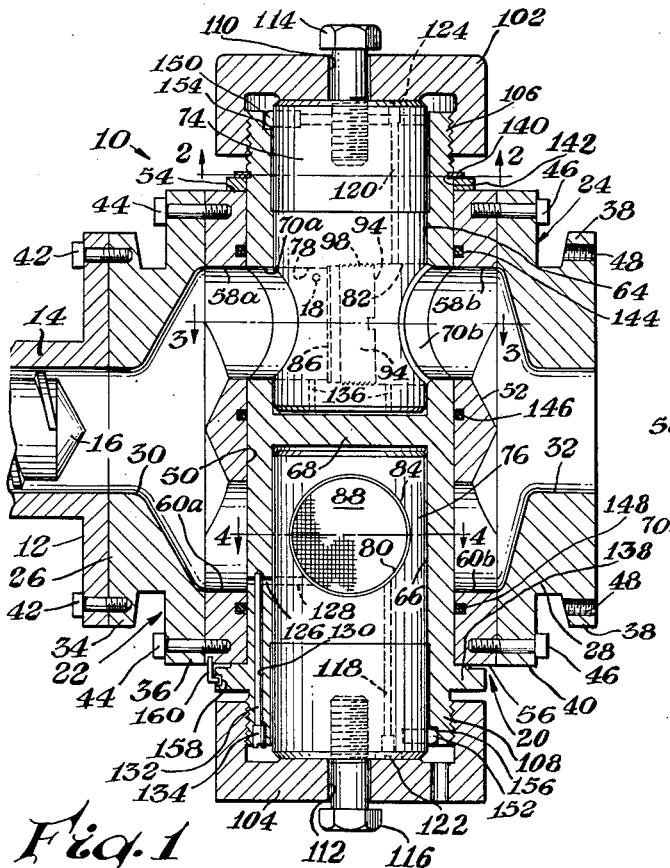
FIG. 1 is a side elevational view, in section, of screen changing apparatus in accordance with this invention.
Figure 2:
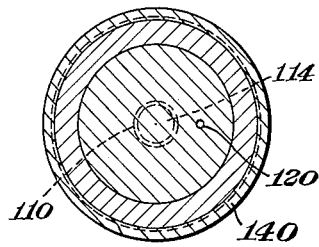
FIG. 2 is a sectional view taken along the line 2—2 of FIG. 1.
Figure 3:
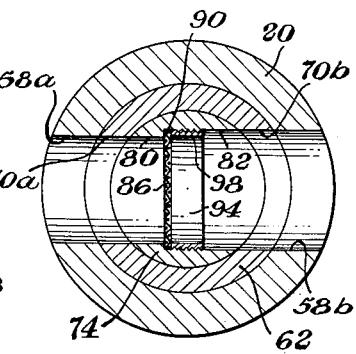
FIG. 3 is a sectional view taken along the line 3—3 of FIG. 1.

Referring to the drawings, and particularly to FIG. 1, there is shown a screen changer apparatus, indicated generally by the numeral 10, which is coupled to the output end 12 of an extruder barrel 14 in which is disposed a rotatable screw 16 for example. The output mounting flange 38 of the apparatus 10 is adapted to be coupled to a suitable die (not shown).

The apparatus 10 comprises a central body section 20, an input section 22, and an output section 24. The input and output sections 22, 24 each comprise a tubular part 26, 28 having an axial flow bore 30, 32 respectively. The bores 30, 32 are larger in diameter adjacent to the body section 20 than at their other ends. Each of the tubular parts 26, 28 have outwardly extending mounting flanges 34, 36 and 38, 40 respectively at their ends. Bolts 42 secure the input section 22 to the extruder barrel, bolts 44 secure the input section to the body section 20, and bolts 46 secure the body section 20 to the output section 24. A threaded bore 48 in the flange 38 are provided whereby a suitable die (not shown) may be bolted to the output section 24.

The body section 20 is an elongated tubular section whose inner bore has a wall 50, an outer wall 52, a top end 54 and a bottom end 56. The top and bottom ends 54, 56 are parallel and perpendicular to the longitudinal axis of the section. The section 20 has an upper and lower pair of spaced apart transverse apertures 58a, 58b and 60a, 60b each of whose longitudinal axis is perpendicular to but intersects the longitudinal axis of the section and each aperture of each pair are also axially aligned. The diameter of each of the apertures 58a, b or 60a, b approximates the inner diameter of the extruder barrel 14. The bores 30, 32 referred to above are large enough at the ends thereof adjacent to the body section 20 to surround the apertures 58a, 60a and 58b, 60b respectively. Preferably the outer wall 52 of the section 20 is tapered from the edges of the apertures 58, 60 towards the bores 30, 32 to provide better stream lining of flow from the bores 30, 32 to and from the apertures.

Figure 4:
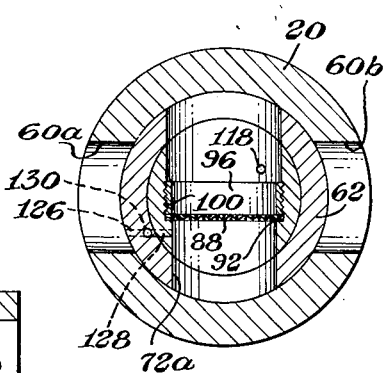
FIG. 4 is a sectional view taken along the line 4—4 of FIG. 1.
Figures 5, 6:
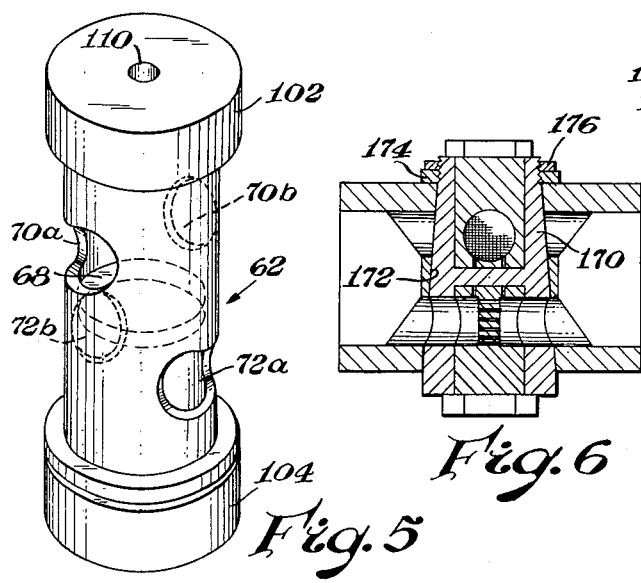
FIG. 5 is an isometric view of the valve plug of the apparatus shown in FIGS. 1 to 4.
FIG. 6 is a schematic view of another embodiment of the apparatus shown in FIG. 1.

The center plug 62, which fits within the body section 20, is shown in FIG. 5 in isometric form in addition to being shown in FIGS. 1–4. The plug 62 comprises a cylindrical member having an axial bore 64, 66 extend inwardly from each end. The bores 64, 66 are separated from each other by a transverse partition 68 which extends across the plug 62. The partition 68, when the plug is in its operative position within the body member 20 (the outer diameter of the plug being a slide fit within the inner diameter of the body member), lies between and is parallel with respect to the pairs of apertures 58a, 58b and 60a, 60b. The length of the plug 62 is at least slightly longer than the length of the bore of the body section 20 to facilitate securing the plug 62 in operative position in the body section.

The wall of the plug 62 which surrounds the bore 64 contains a transversely disposed coaxial pair of apertures 70a 70b which are of approximately the same diameter as the diameter of the apertures 58a, 58b and whose longitudinal axis is in the same plane as the longitudinal axis of the apertures 58a, 58b when the plug 62 is in its operative position within the body section 20.

The wall of the plug 62 surrounding the bore 66 contains a pair of transversely disposed coaxial apertures 72a, 72b which are of approximately the same diameter as the apertures 60a, 60b and whose longitudinal axis is in the same plane as the longitudinal axis of the apertures 60a, 60b when the plug 62 is in its operative position within the body section 20. The pairs of apertures 70a, 70b and 72a, 72b in the plug 62 are displaced 90 degrees with respect to each other around the circumference of the plug 62 (see FIGS. 3 and 4 especially).

Each of the apertures 70b, 72b is slightly larger in diameter than is its corresponding aperture 70a, 72a on the respective opposite side of the plug 62.

Each of the bores 64, 66 contains a cylindrical core element 74, 76 respectively. The core elements 74, 76 are solid cylindrical metal parts having a diameter such that the elements will fit closely but slidably within the respective bores 64, 66. The elements 74, 76, when in their operative position within the bores 64, 66 extend from near to the partition 68 to at least near to the respective open ends of the plug 62.

Each of the core elements 74, 76 has a transverse bore 78, 80 extending therethrough. The bores 78, 80 lie in parallel planes, are each perpendicular to the common longitudinal axis of the elements 74, 76, are perpendicular to each other and have diameters corresponding to the bores 70a, 72a in the plug 62.

Each bore 78, 80 has a counterbore part 82, 84 which is of the same approximate diameter as the diameter of the bores 70b, 72b. A screen member 86, 88 respectively is disposed in each of the bores 78, 80, the screen being seated against the shoulder 90, 92 of the respective counterbored part 82, 84 of each bore. Each screen is held in place within the counter-bored part by means of an annular retainer element 94, 96 which is secured to the wall of the counter-bored part as by threads 98, 100.

A cap member 102, 104 is adapted to engage the threaded outer wall parts 106, 108 respectively of the plug 62, and bear against the top end of the respective core elements 74, 76. Each cap 102, 104 contains a bore 110, 112 respectively through which a bolt 114, 116 respectively extends, engaging the respective core elements 74, 76.

Longitudinal bores 118, 120 extend from the upper end of each core element 74, 76 to the transverse counter bores 82, 84 respectively. The outer end of each of the bores 118, 120 is closed by means of a counter sunk screw 122, 124.

A small bore 126 extends transversely through the side wall of the plug 62 in a plane parallel to the screen 88 when that screen is oriented in its inoperative position (see FIG. 4). A bore 128 in the core element 76 is aligned with the bore 126 when the core element 76 is in its closed or inoperative position, the bore 128 communicating with the transversely extending bore 80.

A longitudinal bore 130 extends from the end of the plug 62 which is adjacent to the cap 104 to the bore 126, the bore 130 being at least as large in diameter as the bore 126 and with its longitudinal axis intersecting the longitudinal axis of the bore 126. An elongated rod 132 having a head 134 which is recessed in and threadedly engaged with the wall of the plug 62 extends in close fitting slidable relationship down the bore 130 and closes the bore 126.

A smililar array of bores of which the opening of bore 18 is the only one visible (see FIG. 1), but corresponding to the bores 126, 128, 130, and 118 is provided in the core element 74 and the part of the plug 62 in which it is inserted.

Each of the core elements 74, 76 contain at least one small diameter longitudinal axial bore 136 which extends between the bottom of the core element and its bore 78 or 80. Such bores 136 relieve any piston effect when the core elements are inserted in the plug 62.

In operation the plug 62 is inserted in the central body section 20 with the outwardly extending flange 138 on the plug fitting snugly against the lower end of the body section 20. A retaining ring 140 is then inserted in the groove 142 near the other end (the upper end as seen in FIG. 1) of the plug 62, holding the plug within the body section with substantially no longitudinal movement permitted.

Grooves 144, 146, and 148, each containing O ring gasket seals, are disposed in the wall 50 of the body section on each side of the bores 70a, 70b and 72a, 72b, preventing the flow of extrudable material along the entire common wall length between the plug and the body section.

The core elements 74, 76 are disposed in the plug 62 and held in correct radial position therein by means of the locator pin 150, or 152 and indexing grooves 154 or 156. The disposition of the pins and grooves are such that the bores 78 and 80 are aligned with the bores 70a, 70b and 72a, 72b in the plug 62.

The outwardly extending flange 138 on the plug 62, which is of circular cross sectional configuration, contains a groove 158 which extends 90 degrees around the circumference of the flange. A movement arresting arm 160 extends from the body section 20 into the groove 158, limiting movement of the plug between the one extreme position where the entire flow of extrudable material is through the screen 86 and the other extreme position where the apertures 60a, 60b are aligned with apertures 72a, 72b and the entire flow of extrudable material passes through the screen 88.

Thus, to change the flow of extrudable material from one screen to the other, the plug 62 is merely rotated 90 degrees circumferentially, and while one screen passageway is being closed the other screen passageway is being opened. Consequently the flow of material through the device 10 is never cut off regardless of the position of the plug 62.

When it is desired to change filter screens, the core containing the filter screen which is not in use is loosened by tightening the bolt 114 or 116 (depending on which core is to be removed) against the adjacent cap 102 or 104 and then backing off the cap on the threaded parts 106 or 108. This will break loose the core. The bolt 114 or 116 is then removed, the cap removed, and the core removed from the plug 62.

Assuming that a similar core is to be replaced in the core receiving bore, the core is inserted in the plug and properly indexed by means of pin 150 or 152. The cap 102 or 104 is then tightened on the threaded end pars 106 or 108. The closure screw 122 of bore 118 (or its counter-part in the other core element 74) is opened. The valve 132 across the bore 126 (or its corresponding part) is withdrawn, opening the bore 126 to the passage of extrudable material which then flows into the screen containing bore of the core, purging air from the screen bore and other communicating areas through the bore 118. When extrudable material rather than air issues from bore 118, the valve 132 is closed and the closure screw 122 is reinserted in bore 118.

The bolt 114 or 116 is then tightened against the cap 102 or 104 and the plug rotated (by means of a wrench engaging the cap 102 or 104) to place the clean screen on the flow stream.

Thus, whichever screen is used, the flow path through the apparatus 10 is approximately the same as at the output of the extruder barrel. The flow through the apparatus 10 when the plug 62 is rotated to change the "on stream" filter changes only slightly and does not disrupt to any consequential extent the continuous output of the extruder.

It will be appreciated that the screen changing apparatus of this invention is simple in form, easy to operate, and economical to manufacture as compared with more conventional screen changing apparatus.

While the invention has been principally described in connection with the device shown in FIGS. 1-5, it is recognized that a tapered plug-type valve of the type shown schematically in FIG. 6 may be used instead of the cylindrical plug 62 as used in FIGS. 1-5.

In the arrangement shown in FIG. 6 the tapered plug 170 is inserted in a tapered bore 172 in the valve body and held in rotatable but sealed relationship with respect thereto by the nut 174 and locking nut 176. The internal structure of the plug 170 and the individual core elements, locating means, purging means, etc. can be generally as described in connection with FIGS. 1-5.

It is also recognized that while the filter screen apparatus of this invention is particularly adapted to use with extruder apparatus it will be useful in many applicaions where filter screens in flow lines must be changed without interrupting flow through the apparatus.

What is claimed is:

1. Screen changing apparatus comprising a body section, an input section and an output section, said input section having a flow channel extending therethrough and having means to secure said input section to said body section, said output section having a flow channel and means for securing said section to said body section, said body section having a longitudinally axially extending plug receiving bore having a circular transverse cross sectional configuration and two pairs of transversely extending flow apertures, the longitudinal axis of each pair being parallel with the longitudinal axis of the other and intersecting the longiudinal axis of said plug receiving bore, one of each par of said flow apertures communicating with the flow channel of the input section and the other aperture of each pair of said flow apertures communicating wtih said flow channel of the output secion, said body secion having a plug disposed in he plug receiving bore, said plug having two hollow wall sections separated by a partition, each of said wall sections having a pair of transversely extending feedthrough apertures therein, the longitudinal axis of the said feedthrough apertures lying in parallel planes and passing through the longitudinal axis of said plug receiving bore, the longitudinal axes of said feedthrough bores being dispersed at a ninety degree angle with respect to each other, each pair of feedthrough apertures being in the same axial plane as one pair of said flow apertures when said plug is in its operative position in the plug receiving bore, each of said hollow wall sections having a removable core therein, each of said cores having a transversely extending flow bore which is aligned with said feedthrough apertures, each flow bore having a filter screen extending across it, and means for rotating said plug to align a predetermined pair of said feedthrough apertures with a pair of said flow apertures.

2. Apparatus in accordance with claim 1, wherein means are provided for purging air from the feedthrough bore which is not in communication with one pair of said flow apertures.

3. Apparatus in accordance with claim 1, wherein said plug is a tapered plug.

4. Apparatus in accordance with claim 1, wherein said plug is cylindrical in outer configuration.

No references cited.